United States Patent [19]
Horii

[11] Patent Number: 5,575,551
[45] Date of Patent: Nov. 19, 1996

[54] ILLUMINATING DEVICE FOR VEHICLES

[75] Inventor: Yasutoshi Horii, Toyoake, Japan

[73] Assignee: Nippondens Co., Ltd, Kariya, Japan

[21] Appl. No.: 455,894

[22] Filed: May 31, 1995

[30] Foreign Application Priority Data

May 31, 1994 [JP] Japan ................................ 6-118491

[51] Int. Cl.⁶ .................................................. F21V 7/04
[52] U.S. Cl. ............................... 362/32; 362/61; 385/32; 385/33; 385/901
[58] Field of Search ................................ 362/32, 61, 26, 362/27, 80, 304, 297; 385/32, 33, 901

[56] References Cited

U.S. PATENT DOCUMENTS

| 4,811,172 | 3/1989 | Davenport et al. | 362/61 |
| 5,343,367 | 8/1994 | Davenport et al. | 362/32 |
| 5,347,433 | 9/1994 | Sedlmayr | 362/32 |
| 5,365,412 | 11/1994 | Koppolu et al. | 362/61 |
| 5,369,554 | 11/1994 | Erion | 362/32 |
| 5,406,462 | 4/1995 | Fallahi et al. | 362/32 |
| 5,416,669 | 5/1995 | Kato | 362/32 |
| 5,436,806 | 7/1995 | Kato | 362/32 |
| 5,438,485 | 8/1995 | Li et al. | 362/61 |
| 5,499,166 | 3/1996 | Kato et al. | |

FOREIGN PATENT DOCUMENTS

| 623780 | 11/1994 | European Pat. Off. . |
| 6-68702 | 3/1994 | Japan . |

*Primary Examiner*—James C. Yeung
*Attorney, Agent, or Firm*—Cushman, Darby & Cushman

[57] ABSTRACT

A lamp device comprises an optical fibre which receives an incident light from a light source and emits an outgoing light, a light conducting path lens connected to the optical fibre so as to receive the light emitted from the optical fibre and a light shielding member which has a window disposed between an outgoing light plane of the optical fibre and an incident light plane of the light conducting path lens. The shape of incident light on the incident light plane of the light conducing path lens is made rectangular.

9 Claims, 7 Drawing Sheets

ILLUMINATING DEVICE FOR VEHICLES

CROSS REFERENCE TO RELATED APPLICATION

This application is based upon and claims priority of Japanese Patent Application No. 6-118491 filed on May 31, 1994, the content of which is incorporated herein by reference.

BACKGROUND OF THE INVENTION

1. Field of the Invention

The present invention generally relates to an illuminating device for vehicles, which is suitable to be used as a headlamp of vehicles or the like.

2. Description of Related Art

Figure 9:
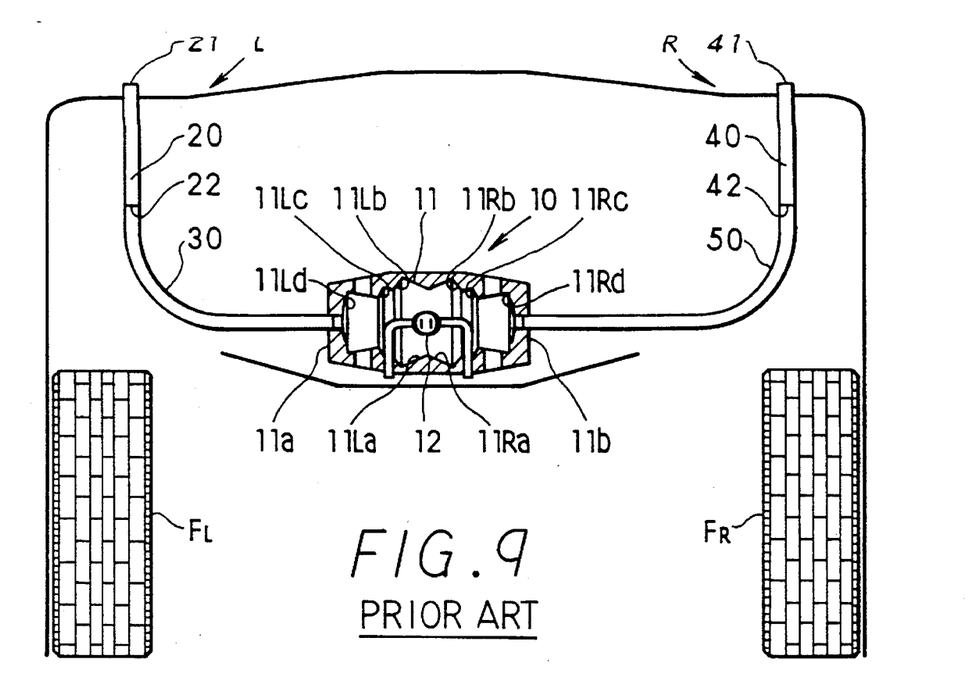
FIG. 9 is a partial cut-away view illustrating a conventional illuminating device for a vehicle.

Regarding an illuminating device for vehicles, it is generally known a device as shown by FIG. 9, for example, in which light emitted from a light source is introduced into one end of an optical fibre and the incident light is guided through the optical fibre so as to be emitted from a light conducting path lens provided at the other end of the optical fibre. In other words, in FIG. 9, the illuminating device for a vehicle comprises a light source 10 disposed at the center of front part of a vehicle and a pair of headlamps L and R disposed symmetrically with respect to the light source 10. The light source 10 has an approximately cylindrical casing 11 in which a discharge lamp 12 is disposed at the center of axial direction as a linear or line light source.

Further, each of left side elliptical mirrors 11La through 11Ld and each of right side elliptical mirrors 11Ra through 11Rd are formed symmetrically in the sidewise direction over the internal peripheral wall of the casing 11. Then, light released from the discharge lamp 12 is reflected by the right side elliptical mirror 11Ra and each of left side elliptical mirrors 11Lb through 11Ld and condensed at the center of right side wall 11b of the casing 11 while, at the same time, the light is reflected by the left side elliptical mirror 11La and each of left side elliptical mirrors 11Rb through 11Rd and each of right side elliptical mirrors 11Ra through 11Rd and condensed at the center of left side wall 11a of the casing 11.

Figure 10:
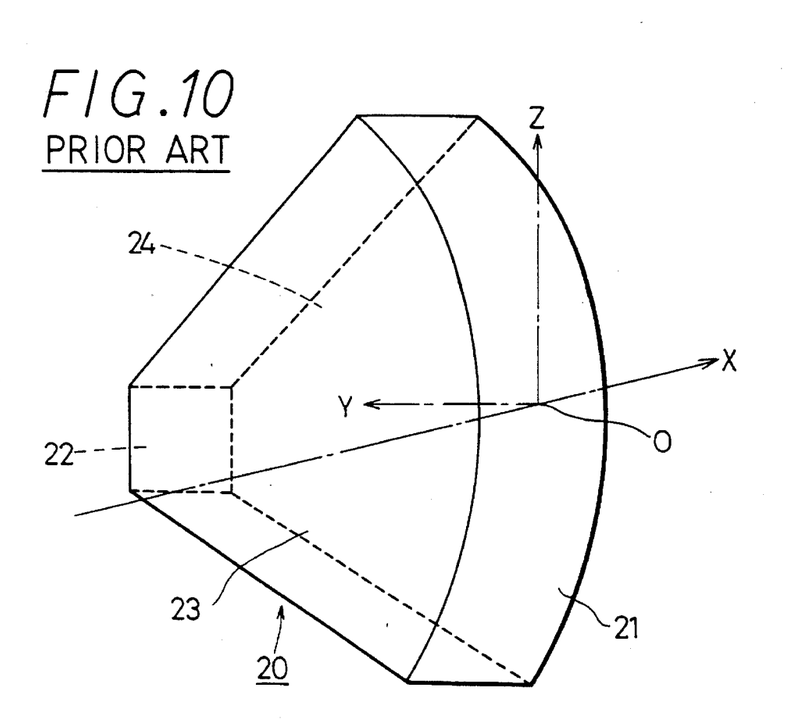
FIG. 10 is an enlarged perspective view illustrating the lamp device of FIG. 9.

The left headlamp L comprises a light conducting path lens 20 provided at the left front part of the vehicle and an optical fibre 30 connecting between the light conducting path lens 20 and the light source 10. On the other hand, the right headlamp R comprises a light conducting path lens 40 provided at the right front part of the vehicle and an optical fibre 50 connecting between the light conducting path lens 40 and the light source 10. The light conducting path lens is as illustrated in FIG. 10 and FIG. 11A, and, as shown by FIG. 12A, cross sectional shape of the light conducting path lens 20, which is cut out in X-Y plane, is approximately trapezoidal while cross sectional shape which is cut out in X-Z plane, resembles approximately a fan or an arc shape.

Figure 11A:
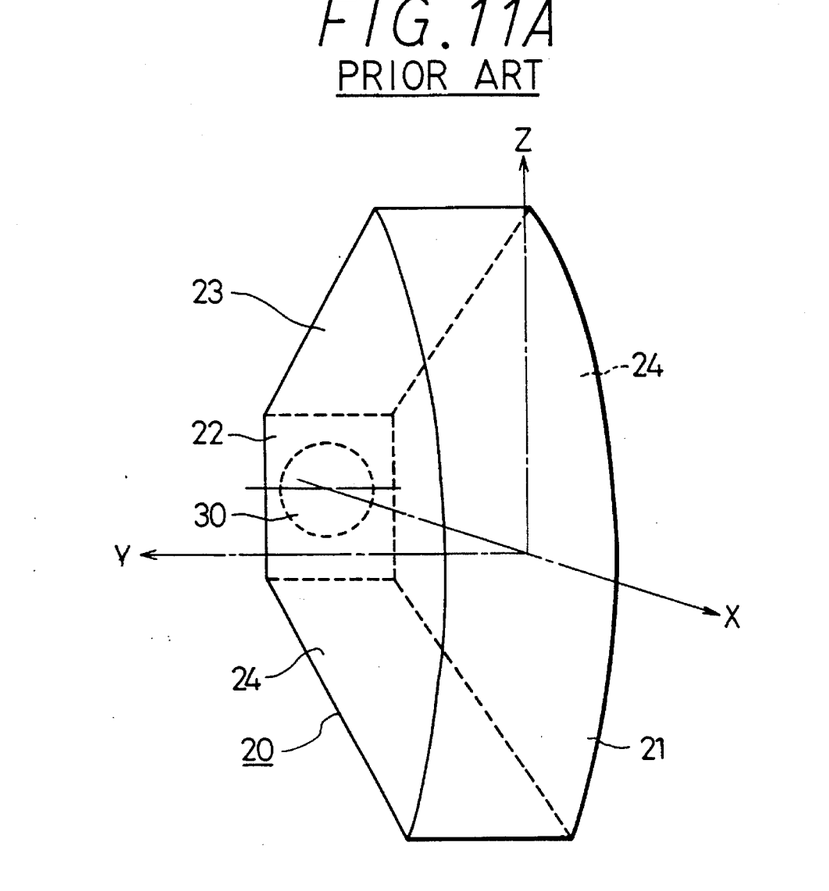
FIGS. 11A and 11B are perspective view of the lamp device and a light distribution curve of outgoing light of the conventional device, respectively.
Figure 11B:
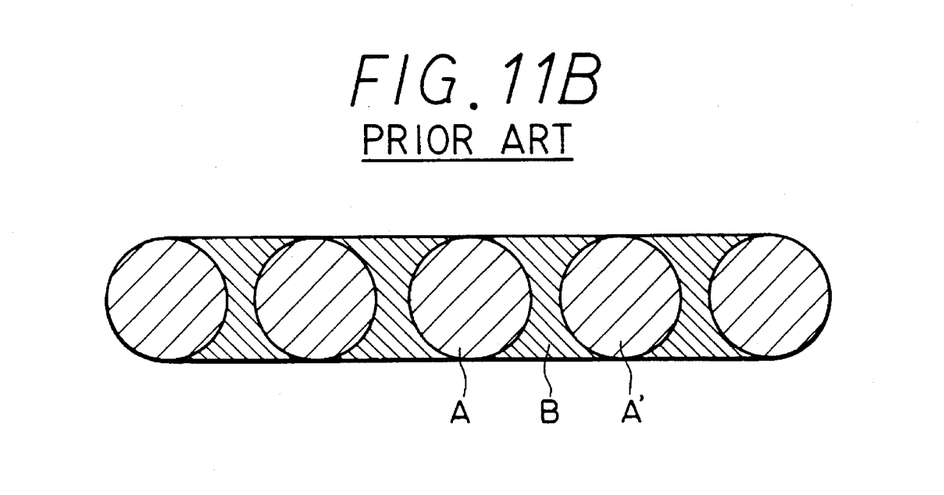

However, in the construction as described above, if the shape projected from the optical fibre 30 onto incident light plane 22 of the light conducting path lens 20 is a disc as shown by FIG. 11A, when the incident light from the optical fibre 30 onto the light conducting path lens 20 progresses while being reflected on reflection planes 23 and 24, and emits from outgoing light plane 21, images projected from the optical fibre 30 onto the incident light plane 22 of light conducting lens 20 appear equivalent to the number of reflections on the reflection planes 23 and 24. In the case, if the shape of optical fibre 30 is projected straightly onto the incident light plane 22, a bright part A in a disc and a bright part A' in a neighboring disc do not become continuous as shown by FIG. 11B and consequently a problem of incoherent brightness caused by the bright part A in the disc and a dark section B outside the disc results.

Figure 12A:
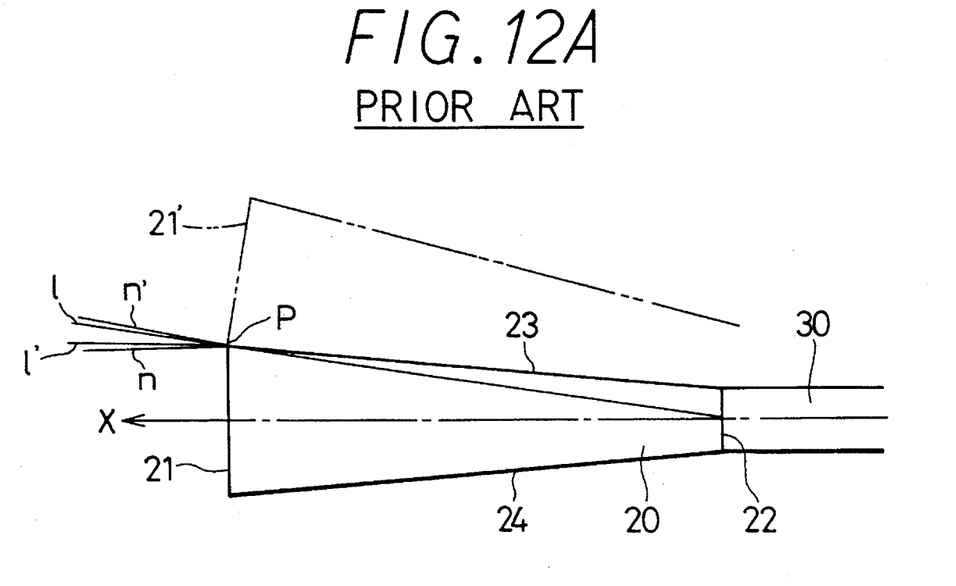
FIGS. 12A and 12B are a partial cross sectional view (cross section of X-Y plane) of the lamp device and a light distribution curve of the outgoing light of the conventional device.
Figure 12B:
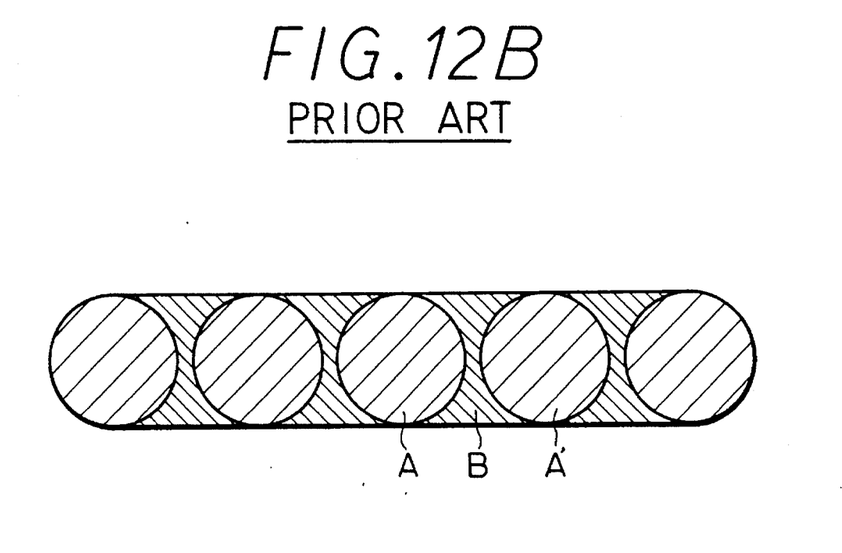

Further, as shown by FIG. 12A, if a reflection on the reflection plane 23 is considered, when the incident light emitted from the optical fibre 30 and entering in the light conducting path lens 20 progresses while being reflected by the reflection planes 23 and 24 and emits from the outgoing light plane 21, since tilts of the perpendicular line n on the outgoing light plane 21 and the perpendicular line n' on an imaginary outgoing light plane 21' are not coincidental at a point P, direct outgoing light 1 and outgoing light 1' after reflection do not become continuous and thus, as shown by FIG. 12B, the bright part A in the disc and the bright part A' in the neighboring disc do not become continuous so that a problem of incoherent brightness consisting of bright parts A and A' in the discs and a dark part B out of the discs results.

SUMMARY OF THE INVENTION

In order to prevent such problems, proposed by the present invention is an illuminating device for a vehicle, which retains the function inherent to a head lamp with a simple and compact construction and at the same time produces a clear illumination avoiding incoherent brightness.

According to the present invention, light coming from a light source is emitted from an optical fibre and enters in a light conducting path lens and the light conducting path lens emits the incident light from the optical fibre. In this case, since a light shielding member is disposed between the light conducting path lens and the optical fibre, such lamp device can be provided in a simple construction and a low cost.

In addition, the incident light is reflected totally on right and left side plane of the light conducting path lens and illuminate ahead of the vehicle with a horizontally flat light distribution. Further, an outgoing light plane is designed to form a lens plane having a predetermined radius of curvature, a function inherent to a head lamp to illuminate far ahead of the vehicle without producing an incoherent brightness in the light distribution from the outgoing light plane is ensured. Still further, since the light outgoing from the optical fibre can be introduced efficiently into the light conducting path lens without loss, the light loss decreases and an efficient light entrance is assured and thus a substantial advantage of enhanced light efficiency is achieved.

DETAILED DESCRIPTION OF THE PREFERRED EMBODIMENTS

Figure 1:
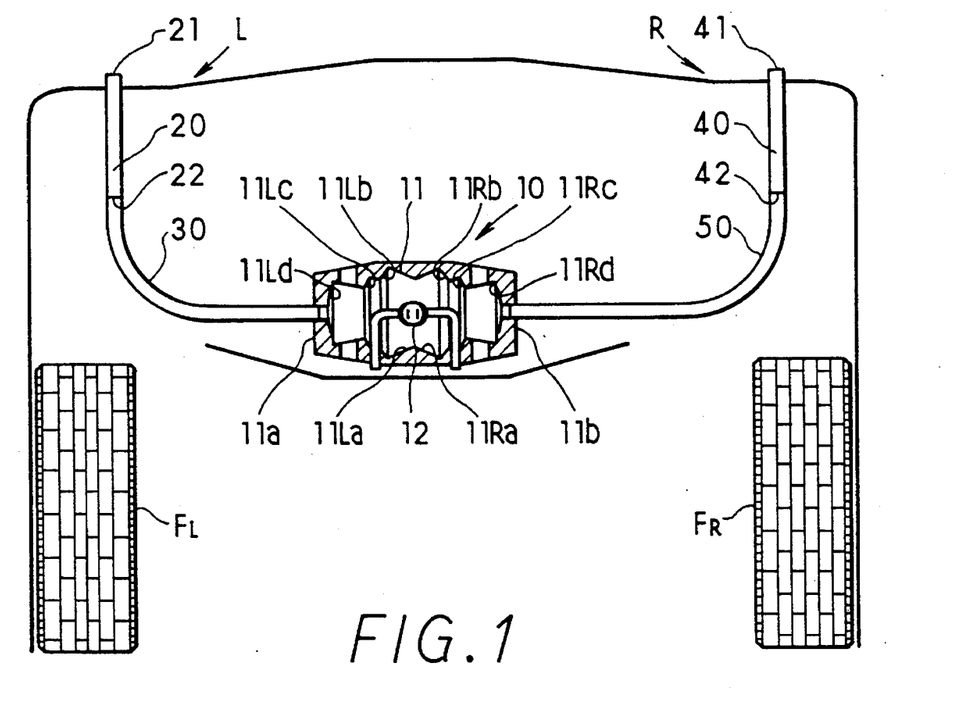
FIG. 1 is a partial cut-away view of a preferred embodiment of an illuminating device for vehicles in accordance with the present invention.

Referring to figures, first embodiment according to the present invention is described below. FIG. 1 illustrates a lamp device for a vehicle according to the present invention, in which a light source 10, optical fibre 30 and optical fibre 50 are constructed basically same as described referring to a conventional illuminating device illustrated by FIG. 7 excepting the construction of the light conducting lenses 20 and 40. In other words, in FIG. 1 same as FIG. 7, there comprises a light source 10 which is placed at the center of front part of vehicle, and a pair of headlamps R and L which are disposed symmetrically relative to the light source. The light source 10 has an approximately cylindrical casing 11 in which a discharge lamp 12 as a line or linear light source is disposed at the center in the axial direction. In addition, each of left side elliptical mirrors 11La through 11Ld and each of right elliptical mirrors 11Ra through 11Rd are formed symmetrically around the discharge tube over the internal peripheral wall of the casing 11. In this case, light discharged from the discharge tube 12 is reflected by the right side elliptical mirror 11Ra and each of left side elliptical mirrors 11Lb through 11Ld and converges at the center of the right side wall 11b of the casing 11 while at the same time the light is reflected on the left side elliptical mirror 11La and each of right side elliptical mirrors 11Rb through 11Rd and converges at the center of the left side wall 11a of the casing 11. It should be noted that each numeral of FL and FR represents right and left front wheels of the vehicle.

The left headlamp L comprises a light conducting path lens 20 provided at the front part of the vehicle and an optical fibre 30 connecting the light conducting path lens 20 and the light source 10. On the other hand, the right headlamp R comprises a light conducting path lens 40 provided at the front part of the vehicle and an optical fibre connecting the light conducting path lens 40 and the light source 10.

The optical fibre 30 comprises a core (not shown) made of a material having the same or similar light refractive index as the light conducting path lens and a clad (not shown) which covers the core (not shown). Here, the core is made of a material with a high thermal resistance and light transmission ( for example, polycarbonate or acrylic resin materials) and the clad a high thermal resistance and light transmission (for example, fluororesin material) while the light refractive index of the material of clad is smaller than that of the core to ensure a total reflection of light. Further, the core of optical fibre 30 has a diameter of approximately 8 (mm) to 10 (mm), is bent to resemble approximately the letter L as shown by FIG. 1, fixedly attached to the center of the left side wall 11a of the light source 10 and the maximum incident angle of the light coming from the light source 10 and entering in the incident light plane is approximately 30 (degrees). The light conducting path lens 40 of headlamp R is constructed in the same manner as the light conducting path lens 20. Further, the optical fibre 50 is constructed in the same manner as the optical fibre 30. Still further, as shown by FIG. 1, the optical fibre 50 is bent to resemble approximately the letter L, fixedly attached to the center of the right side wall 11b and the maximum incident angle of the light coming from the light source 10 and entering in the incident light plane is approximately 30 (degrees).

FIRST EMBODIMENT

Figure 2:
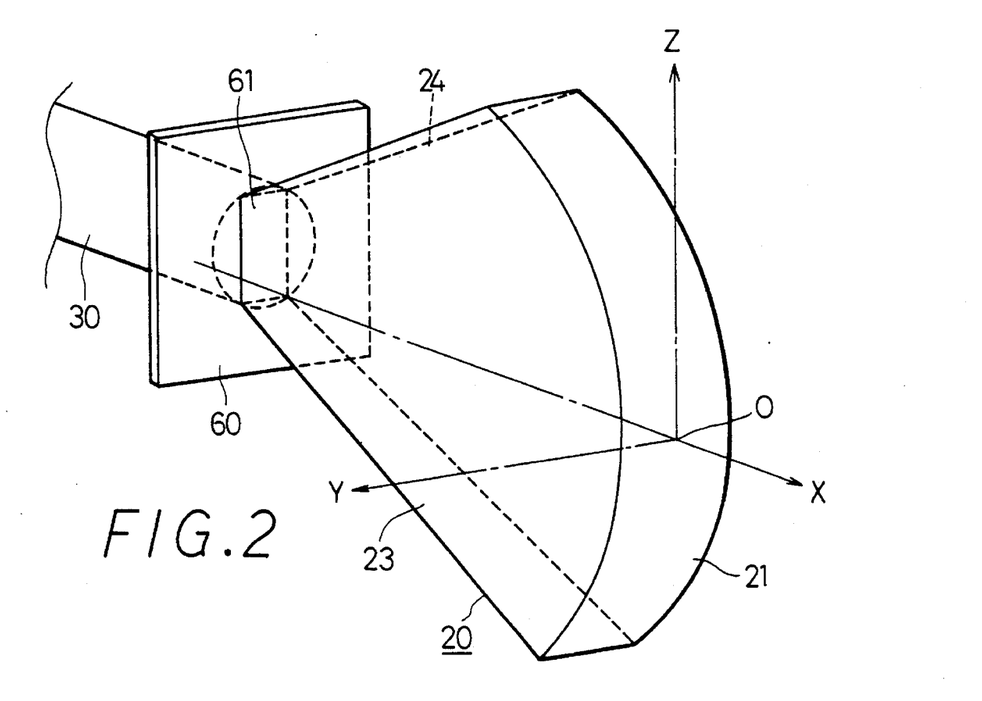
FIG. 2 is an enlarged perspective view illustrating the lamp device of FIG. 1 according to a first embodiment.

The light conducting path lens 20 according to a first embodiment is, as shown by FIG. 2, made of a material having a high thermal resistance and light transmission (for example, polycarbonate or acrylic resin material) and its lateral cross section (cutting plane of X-Y plane) forms a trapezoid while its longitudinal cross section (cutting plane of X-Z plane) forms approximately a fan or arc shape. Pole O of the outgoing light plane 21 of the light conducting path lens 20 is the origin of a three dimension cartesian coordinate. In addition, object point of the outgoing light plane (rear focal point) exists on the optical axis (X axis) near the incident light plane 22 of the light conducting path lens 20.

As it is shown by FIG. 2, a shade 60 as a light shielding member is disposed between the incident light plane 22 of the light conducting path lens 20 and the outgoing light plane of the optical fibre 30. The shade 60 as a light shielding member has a rectangular window 61 which passes light, while any other part than the rectangular window 61 is made of an opaque material of, for example, a metal.

In this case, since center of the rectangular widow 61 of the shade 60 disposed between the light conducting path lens 20 and the optical fibre 30 exists on the optical axis (X axis) of the light conducting path lens 20, a part of light emitted from the outgoing light plane of the optical fibre 30 or a part of light excluding the part shielded by edges of rectangular window 61 of the shade 60 is introduced into the light conducting path lens 20.

Figure 3A:
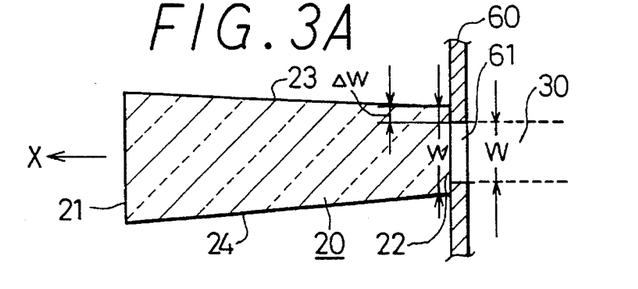
FIG. 3A is a partial cross sectional view (cross section of X-Y plane) of the first embodiment of the lamp device and FIG. 3B is a schematic view illustrating a distribution of light emitted from the lamp device.

As it is described above, since right and left side planes 23 and 24 of the light conducting path lens 20 are contacting with air having smaller light refractive index, the incident light entering in the light conducting path lens 20 is reflected totally by the right and left side planes 23 and 24 and consequently there is no light leaking out of the right and left side planes 23 and 24 of the light conducting path lens 20. As a result, the incident light to the light conducting path lens 20 is, as shown by FIG. 3A, is guided forward while being reflected alternately by the right and left side planes 23 and 24 in the light conducting path lens 20. In this case, angle $\beta$ of light spreading right and left from the outgoing light plane 21 will be given by the following equation 1 provided the incident angle to the light conducting path lens is θ.

$$\beta = 2\sin^{-1}(2n\sin(\theta - N\alpha)) \quad\quad 1$$

Where, α is the spread angle of light conducting path lens 20, n the light refractive index of light conducting path lens 20 and N the number of light reflection inside the light conducting path lens 20. Consequently, the right and left spread angle β of the light emitted from the outgoing light plane 21 of the light conducting path lens 20 can be changed arbitrarily by changing the spread angle α of the light conducting path lens 20. As a result, the light thus guided will be emitted as the light which has an expansion to right and left from the outgoing light plane 21 of the light conducting path lens 20 and is flat horizontally. In the case, the right and left spread angle of the light emitted from the outgoing light plane 21 of the light conducting path lens 20 will reach 60 degrees.

Figure 3B:
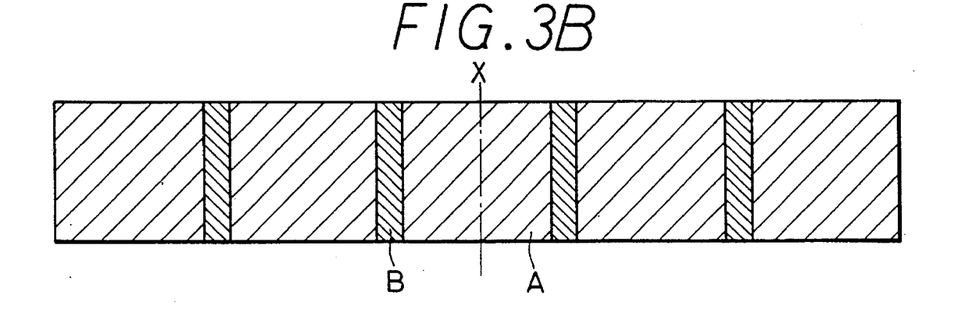

Moreover, since a part of light excluding the part which is shielded by the edges of the window 61 of the shade 60 enters in the light conducting path lens 20 or, in other words, the part of light shielded by the edges of the window 61 of the shade 60 will not enter in the light conducting path lens 20, the light guided forward while being reflected alternately between the right and left side planes 23 and 24, as mentioned above, will be emitted from the outgoing light plane 21 of the light conducting path lens 20 as the light which has a sidewise spread and with a part shielded by the edges of the window 61 of the shade 60 or, as shown by FIG. 3B, cut off at four edges. In this case, the light emitting from the outgoing light plane 21 provides a clear image formation without leaking around and projects forward. As a result, the light will reach far ahead of the vehicle with a high brightness and without causing glare against vehicles running on the opposite lane.

With the first embodiment as described above, when the outgoing light from the light source 10 enters from the left side wall 11a and the right side wall 11b through each incident light end plane at 30 (degrees) in the core of each of optical fibres 30 and 50, each portion of light is reflected by approximately 20 (degrees) of refractive angle, progresses while being totally reflected along in the core of each optical fibre 30 and 50 and finally enters in the light conducting path lens 20 of the headlamp L through the outgoing light plane of the optical fibre 30. In this case, since the core of the optical fibre 30 and the light conducting path lens 20 are made of a material of same or similar light refractive index, the light will be introduced efficiently from the optical fibre 30 to the light conducting path lens.

Further, since the shade 60 as a light shielding member has a rectangular window to pass the light, the incident light to the light conducting path lens 20 will progress while being reflected by the reflection planes 23 and 24 and, when emitting from the outgoing light plane 21, the outgoing light will, as shown by FIG. 3B, project a number of rectangular shapes of the incident light plane 22 which are placed in a row in the sidewise direction (Y axis) and are equivalent to the number of reflections so that, when compared with the one having a shade with a circular window or no shade, a substantial advantage that the incoherent brightness decreases dramatically, will be achieved.

SECOND EMBODIMENT

Although, in the second embodiment as mentioned above, the shade 60 witch the rectangular widow is disposed between the optical fibre 30, and the light conducting path lens 20, where width w of incident light plane 22 of the light conducting path lens 20 is larger than the width W of the window 61 of shade 60, the incident light entering in the light conducting path lens 20 progresses while being reflected by the reflective plane 23 and 24 and, when the light emits from the outgoing light plane 21, a number of shapes of the incident light plane 22 will be placed in a row in the sidewise direction (Y direction) which is equivalent to the number of reflections, and, if there is a clearance Δw between the width W of the window 61 of shade 60 and the width w of incident light plane 22, Δw will be enlarged and projected to the outgoing light so that a problem of incoherent brightness consisting of the bright rectangular part A and the dark part B by Δw will appear on the outgoing light.

Figure 4A:
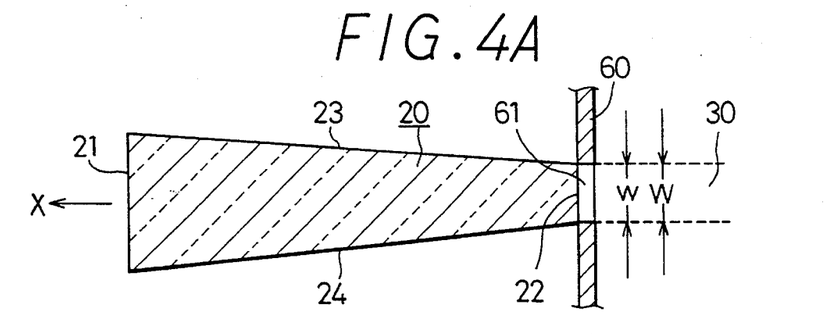
FIGS. 4A and 4B are similar views as FIGS. 3A and 3B and illustrates a second embodiment of the present invention in which a partial cross sectional view (cross section of X-Y plane) and a distribution of light emitted from the lamp device are shown.

The second embodiment is designed to provide the different shape of a shade 60, in the same construction of the light conducting path lens 20 and the optical fibre 30 as the above-mentioned first embodiment, in order to avoid such problem as described above. FIG. 4A illustrates the second embodiment. In FIG. 4A, the shade 60 as the light shielding member is disposed between the incident light plane 22 of the light conducting lens 20 and the outgoing light plane of the optical fibre 30. The shade 60 as the light shielding member has the rectangular window 61 to pass light and any part other than the rectangular window 61 is made of an opaque material of, for example, a metal plate. Here, the width W of the rectangular window 61 and the width w of the incident light plane 22 of the light conducting path lens 20 are designed to be same.

Figure 4B:
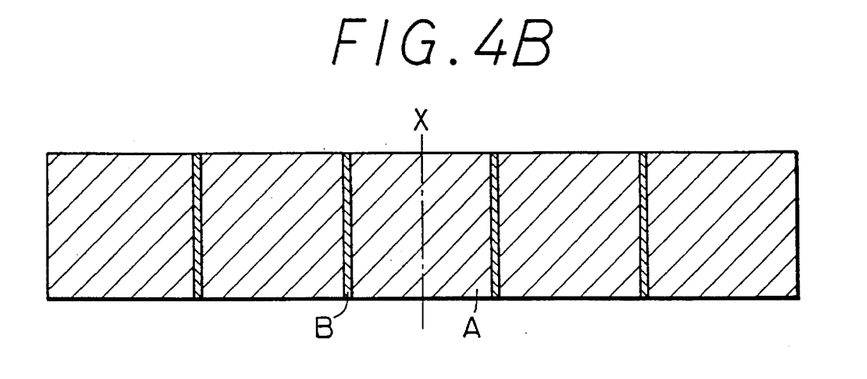

With the second embodiment as constructed above, since the width w of the incident light plane 22 of the light conducting path lens 20 and the width W of the rectangular window 61 of the shade 60 are designed to be same, when the incident light entering in the light conducting path lens 20 progresses while being reflected by the reflection planes 23 and 24 and emits from the outgoing light plane 21, there is no clearance between the width W of the rectangular window 61 of the shade 60 and the width w of the incident light plane 22, which may be enlarged and projected if there is, and so the shapes of incident light plane 22 are placed in a row in the sidewise direction (Y direction) for the number of reflection as shown by FIG. 4B and consequently the incoherent brightness in the light distribution related to the outgoing light is eliminated. However, as it is also understood from FIG. 4B, the section B is darker than the section A so that there still exists a slight incoherent brightness also in the second embodiment.

THIRD EMBODIMENT

Figure 5:
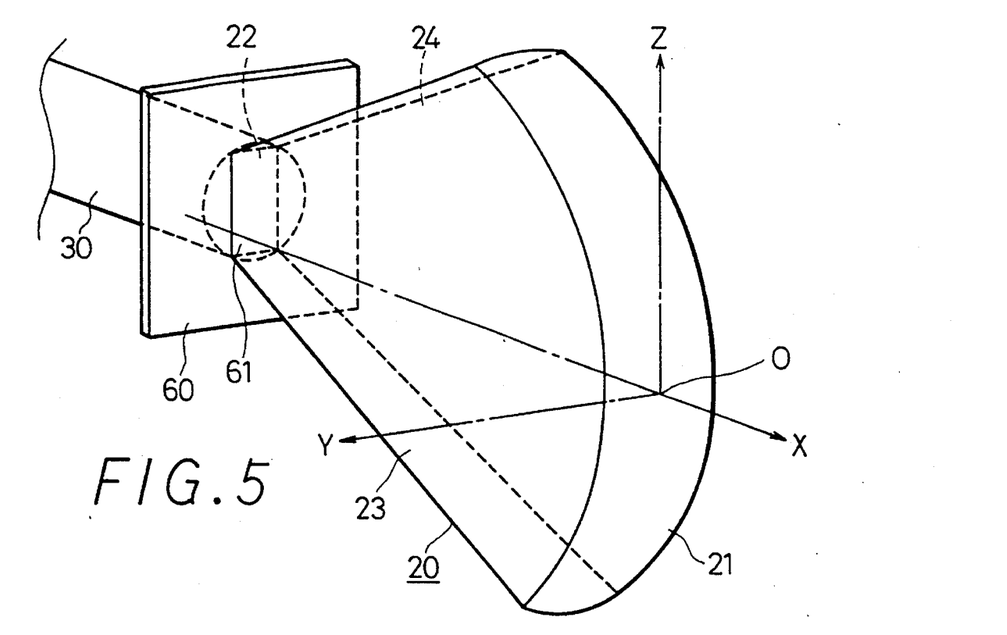
FIG. 5 is an enlarged perspective view illustrating a third embodiment of the present invention.
Figure 6A:
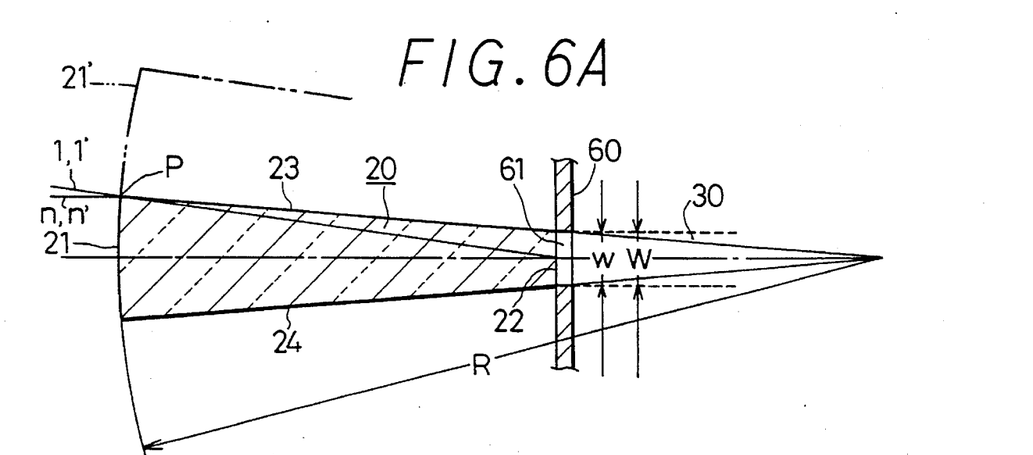
FIGS. 6A and 6B are similar views as FIGS. 4A and 4B and illustrates a third embodiment of the present invention in which a partial cross sectional view (cross section of X-Y plane) and a distribution of light emitted from the lamp device are shown.
Figure 6B:
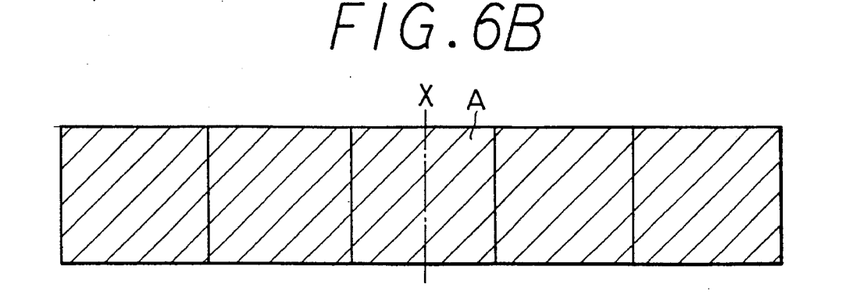

In the third embodiment, a modification is made on the shape of outgoing light plane in addition to the construction as described about the second embodiment 2 above. FIG. 5 and FIGS. 6A and 6B illustrate the third embodiment. In this embodiment, the light conducting path lens 20 is made of a material having a high thermal resistance and light transmission (for example, polycarbonate or acrylic resin material) and is formed to resemble an approximate fan shape both in the longitudinal cross section (cutting plane of X-Z plane) and the lateral cross section (cutting plane of X-Y plane). The outgoing light plane 21 of the light conducting path lens 20 forms a lens plane which has predetermined radiuses of curvature both in the longitudinal cross section (cutting plane of E-Z plane) and the lateral cross section (cutting plane of X-Y plane) and pole 0 of the outgoing light plane 21 is coincidental with the origin of a three dimension cartesian coordinate. In addition, object point focus of the outgoing light plane 21 (rear focus) exists on an optical axis (X axis) near the incident light plane 22 of the light conducting path lens 20.

With the embodiment constructed as above, when the outgoing light from the light source 10 enters from the left side wall 11a and right side wall 11b in the core of each of optical fibres 30 and 50 at angle of 30 (degrees) against each incident light plane, each portion of light is reflected by approximately 20 (degrees), enters in each of optical fibres 30 and 50, is guided along inside of core of each of optical fibres 30 and 50 while being totally reflected and then enters in the light conducting path lens 20 of headlamp L through the outgoing light plane of the optical fibre 30. In this case, since the core of the optical fibre 30 and the light conducting path lens 20 are made of the same material or a material having similar light refractive index, the light will enter efficiently also from the optical fibre 30 to the light conducting path lens 20.

Here, since the shade 60 is disposed between the light conducting path lens 20 and the optical fibre 30 and the center of rectangular window 61 of the shade 60 is disposed on an optical axis or X line of the light conducting path lens 20 in a manner that it will be coincidental with the pole O of the outgoing light plane 21 of the light conducting path lens 20, a part of light emitted from the outgoing light plane of the optical fibre 30 or a part of light excluding the portion shielded by edges of the rectangular window 61 of the shade 60, enters in the light conducting path lens 20.

The incident light entering the light conducting path lens 20 as described above is totally reflected with the left and right side planes 23 and 24 and as a result no light will leak outside from the left and right side planes 23 and 24 because the left and right side planes 23 and 24 are contacting with air having a smaller light refractive index. Therefore, the incident light entering in the light conducting path lens 20 will be guided forward while being reflected totally and alternately in the light conducting path lens 20 with the left and right side planes 23 and 24 as shown by FIG. 6A in the same way as the above-mentioned first embodiment.

Consequently, the light thus guided will emit in turn as the light having a sidewise expansion and is horizontally flat. In the case, the angle of sidewise expansion of the light emitted from the outgoing light plane 21 of the light conducting path lens 20 extends up to 60 degrees. Further, since the outgoing light plane 21 of the light conducting path lens 20 has a lens plane with a predetermined radius R of curvature and thus, as shown by FIG. 6A, the normal line n of the outgoing light plane and the normal line n' of an imaginary outgoing light plane 21' are coincidental at point P, direct outgoing light 1 and reflected outgoing light 1' become continuous so that the incoherent brightness caused by the light distribution of light emitted from the outgoing light plane 21 will be eliminated completely.

Moreover, since the light emitted from the outgoing light plane of the optical fibre 30 enters in the light conducting path lens 20 after removing the portion which is shielded by the sides of rectangular window 61 of the shade 60 or, in other words, the portion of light blocked by the sides of rectangular window 61 of the shade 60 does not enter in the light conducting path lens 20, the light guided forward while being reflected alternately by the left and right side planes 23 and 24 in the light conducting path lens 20 is emitted from the outgoing light plane 21 of the light conducting path lens 20 as light which has a sidewise expansion and, at the same time, is blocked at four sides of the rectangular window 61 of the shade 60, i.e. of which four sides are cut off as shown by FIG. 6B. In this case, the light emitted from the outgoing light plane 21 can be emitted forward with a clear image-formation and without a leakage in the four directions. The light consequently can illuminate far ahead of the vehicle with an intense brightness without causing glare against vehicles running on the opposite lane.

According to the third embodiment, as explained above, when the optical fibre 30 emits the light provided by the light source 10, the outgoing light enters in the light conducting path lens 20. Then, when the light conducting path lens 20 emits the incident light from the optical fibre 30, since the optical axis X of light conducting path lens 20 and the shade 60 are arranged in such a manner that the light distribution of the outgoing light forms a continuous and rectangular light distribution, the light distribution projected by the outgoing light from the light conducting path lens 20 form a desired continuous and rectangular profile. In this case, since the lamp device of such type has a simple construction in which the lamp connects the light conducting path lens 20 and the optical fibre 30 and disposes the shade 60 between the light conducting path lens 20 and the optical fibre 30, so that the lamp device of such type can be provided in a simple construction and a low cost.

Still further, in the the embodiment according to the present invention, since the light conducting path lens 20 has a form approximately resembling a fan or arc shape both in the longitudinal cross section (cutting plane of X-Z plane) and the lateral cross section (cutting plane of X-Y plane) and at the same time the outgoing light plane 21 of the light conducting path lens 10 forms a lens plane which has predetermined radiuses of curvature both in the longitudinal cross section (cutting plane of X-Z plane) and the lateral cross section (cutting plane of X-Y plane), when the optical fibre 30 emits the incident light from the light source 10, the outgoing light enters in the light conducting path lens 20 which is in a shape of fan in the longitudinal cross section and in a shape of rectangular plate in the cross section. Then, the incident light is totally reflected by the left and right side planes so the light conducting path lens 20 which is in a shape of fan in the longitudinal cross section and in a shape of rectangular plate in the lateral cross section and projects a flat light distribution in front of the vehicle without an incoherent brightness. Moreover, since the outgoing light plane 21 of the light conducting path lens 20 makes a lens plane with a predetermined radius of curvature, the inherent function as a headlamp to illuminate far ahead of the vehicle is secured.

Still further, since the optical axis X of the light conducting path lens passes the pole O of the light conducting path lens 20 and at the same time the shade 60 is disposed in a manner that the optical axis X of the light conducting path lens 20 is coincidental with the center of the rectangular window 61 of the shade 60 and thus all of the optical axis X of the light conducting path lens 20, the pole 0 of the light conducting path lens 20 and the center of the rectangular window 61 of the shade 60 are coincidental each other, the light distribution projects a clear, continuous and rectangular profile so that glare will not be projected against the vehicles running on the opposite lane.

Figures 7A, 7B, 8A:
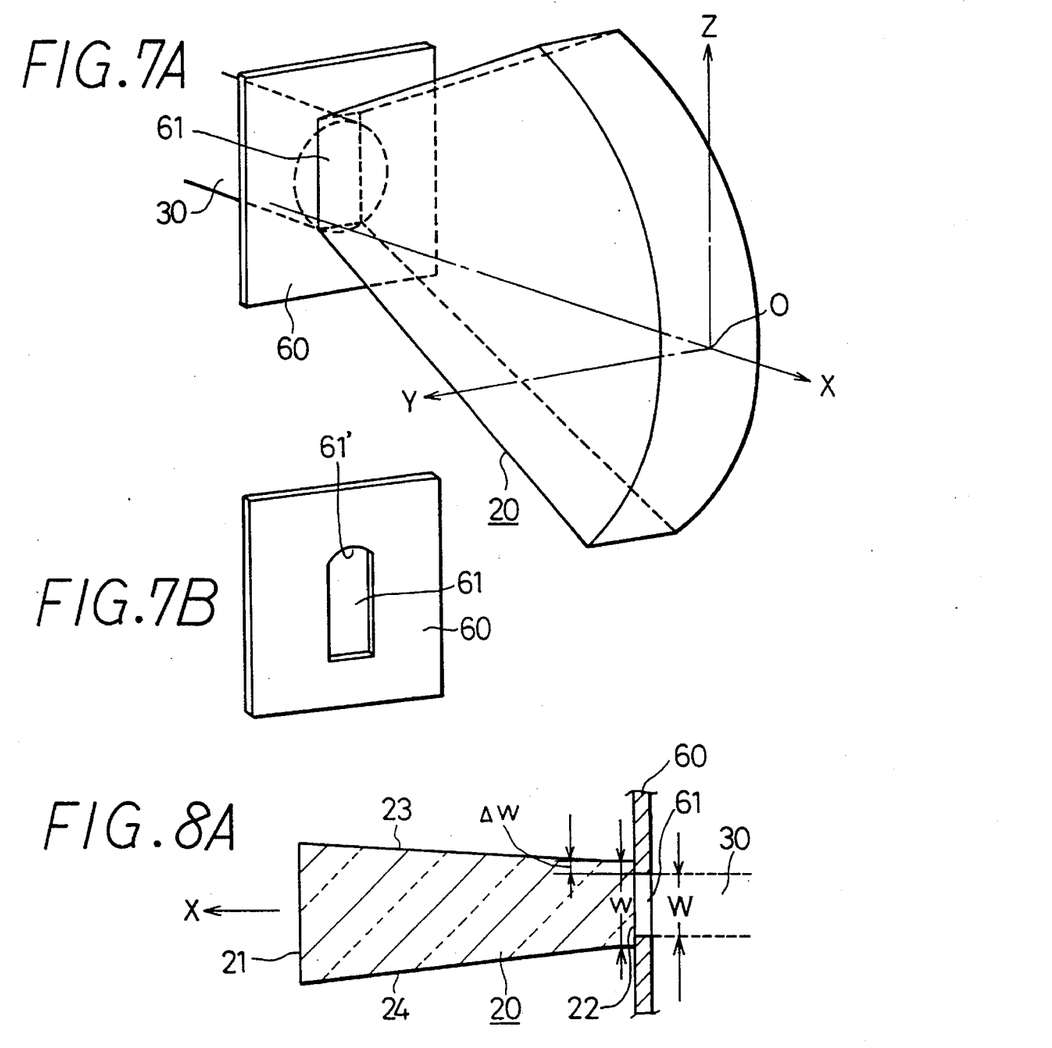
FIGS. 7A, 7B, 8A and 8B are views illustrating a modification of the embodiments, a shade, cross section and light distribution of ° the modified embodiments, respectively.
Figure 8B:
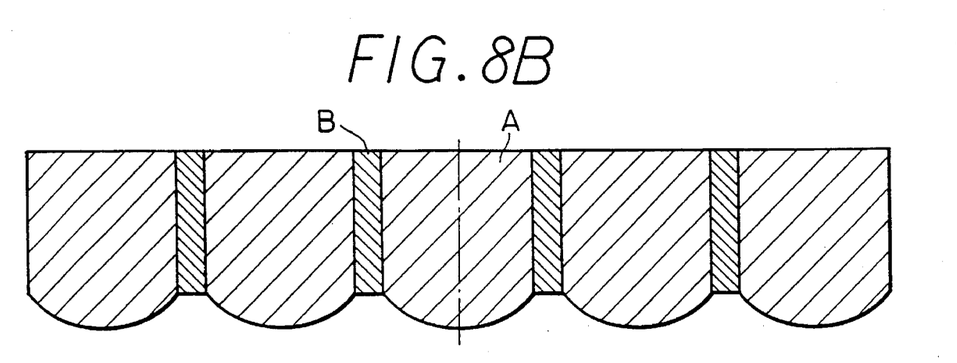

The present invention having been described should not be limited to the first to third embodiments but may be modified in various ways. For instance, the shade 60 may be formed with the window which is in a generally rectangular form but has an arcuate side 61' as shown in FIG. 7B, and the shade 60 may be used as shown in FIG. 7A and FIG. 8A. In this case, a light distribution pattern having an arcuate side form is provided as shown in FIG. 8B.

What is claimed is:

1. An illuminating device for vehicles having a lamp device which emits light from a light source, comprising:

an optical fibre for emitting the light incident from the light source; and a light conducting path lens connected to the optical fibre so that the light from the optical fibre is incident thereto, wherein a shape of the incident light on an incident light plane of the light conducting path lens is made to have two opposing sides parallel to each other, the light conducting path lens is formed to have two opposing planar sides extending in an outgoing light plane of the light conducting path lens from the two opposing parallel sides, the light conducting path lens is formed in an approximately a fan shape both in a longitudinal cross section and a lateral cross section, and the outgoing light plane of the light conducting path lens is shaped to form a lens plane having a predetermined radiuses of curvature both in the longitudinal cross section and the lateral cross section.

2. An illuminating device according to claim 1, wherein a central angle of the fan shape in the lateral cross section is smaller than a maximum incident angle of the light from the light source.

3. An illuminating device according to claim 1, wherein a central angle of the fan shape in the longitudinal cross section is larger than the maximum incident angle of the light from the light source.

4. An illuminating device according to claim 1, further comprising:

a shade having a window interposed between the incident light plane and the outgoing light plane.

5. An illuminating device according to claim 4, wherein a width of the incident light plane and a width of the window are made equal to each other.

6. An illuminating device for vehicles having a lamp device which emits light from a light source, comprising:

an optical fibre for emitting the light incident from the light source;

a light conducting path lens connected to the optical fibre so that the light from the optical fibre is incident thereto; and a shielding member having a window disposed between an outgoing light plane of the optical fibre and an incident light plane of the light conducting path lens, wherein the shape of incident light on the incident light plane of the light conducting path lens is made rectangular.

7. An illuminating device for vehicles having a lamp device which emits light from a light source, comprising:

an optical fibre for emitting the light incident from the light source;

a light conducting path lens connected to the optical fibre so that the light from the optical fibre is incident thereto; and a shielding member having a window disposed between an outgoing light plane of the optical fibre and an incident light plane of the light conducting path lens, wherein a width of the the incident light plane of the light conducting path lens and a width of the window of the shielding member are made equal.

8. An illuminating device for vehicles having a lamp device which emits light from a light source, comprising:

an optical fibre for emitting the light incident from the light source;

a light conducting path lens connected to the optical fibre so that the light from the optical fibre is incident thereto; and a shielding member having a window disposed between an outgoing light plane of the optical fibre and an incident light plane of the light conducting path lens, wherein the light conducting path lens is formed in an approximately a fan shape both in a longitudinal cross section and a lateral cross section and the outgoing light plane of the light conducting path lens is shaped to form a lens plane having a predetermined radiuses of curvature both in the longitudinal cross section and the lateral cross section.

9. An illuminating device for vehicles having a lamp device which emits light from a light source, comprising:

an optical fibre for emitting the light incident from the light source;

a light conducting path lens connected to the optical fibre so that the light from the optical fibre is incident thereto; and a shielding member having a window disposed between an outgoing light plane of the optical fibre and an incident light plane of the light conducting path lens, wherein the shape of incident light on the incident light plane of the light conducting path lens is rectangular, the width of the incident light plane of the light conducting path lens and the width of the window of the light shielding window are made equal, the light conducting path lens is formed in an approximately a fan shape both in a longitudinal cross section and a lateral cross section and the outgoing light plane of the light conducting path lens is shaped to form a lens plane having a predetermined radiuses of curvature both in the longitudinal cross section and the lateral cross section.

* * * * *